Figure 16:
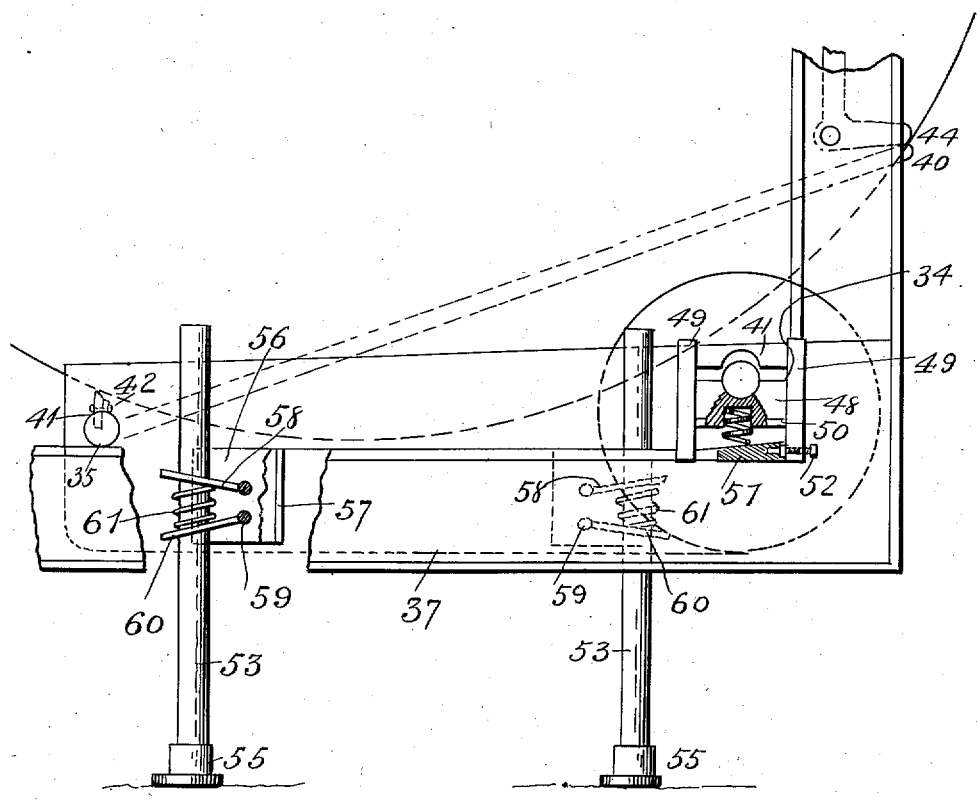

No. 853,644. PATENTED MAY 14, 1907.
B. D. MARKS.
GRAINING MACHINE.
APPLICATION FILED JAN. 30, 1905.
8 SHEETS—SHEET 1.
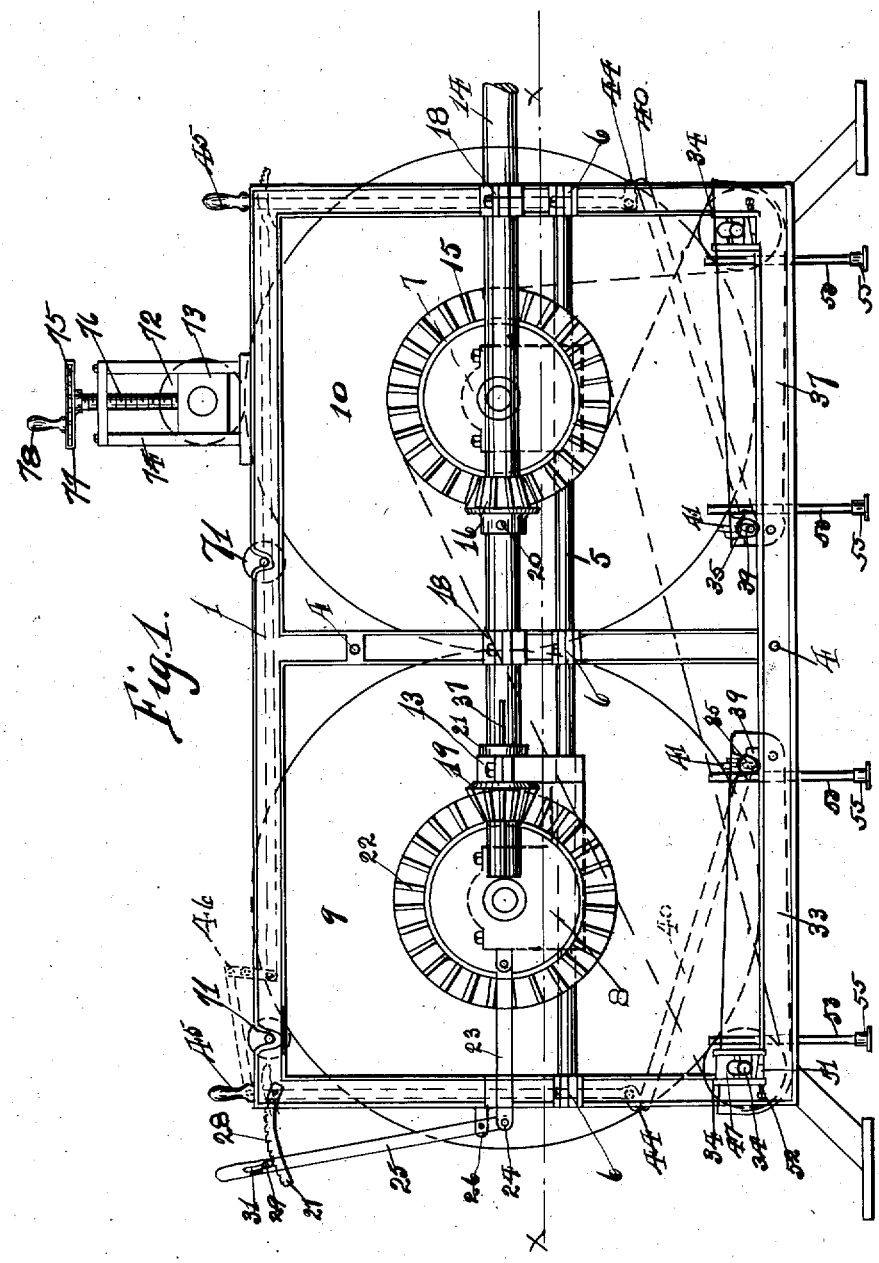
WITNESSES:
J. W. Carroll
S. R. Lewis
INVENTOR.
Bennett D. Marks
BY
Harry Lea Dodson
ATTORNEY.

No. 853,644. PATENTED MAY 14, 1907.
B. D. MARKS.
GRAINING MACHINE.
APPLICATION FILED JAN. 30, 1905.
8 SHEETS—SHEET 2.
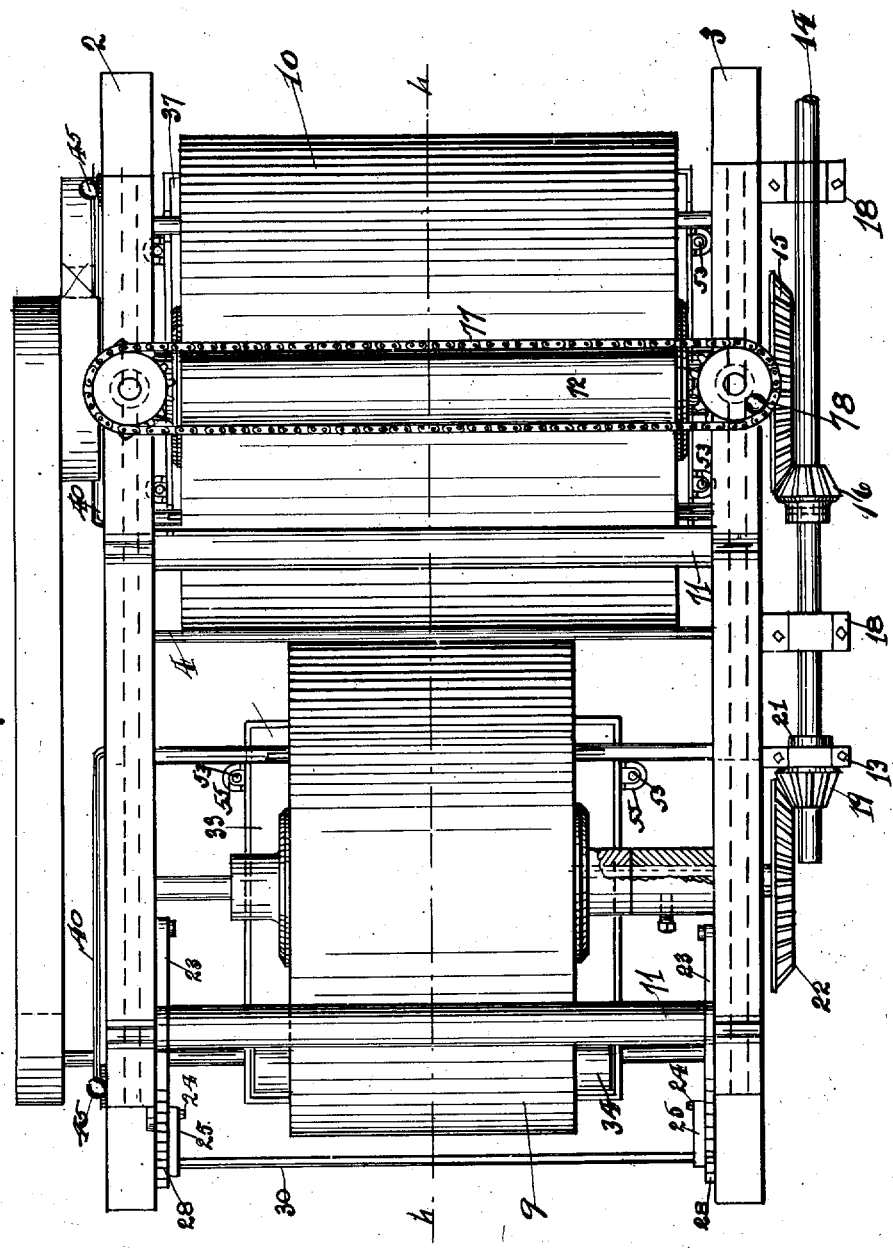
WITNESSES:
J. H. Carroll.
S. R. Lewis.
INVENTOR.
Bennett D. Marks
BY
Harry Lea Dobson
ATTORNEY.

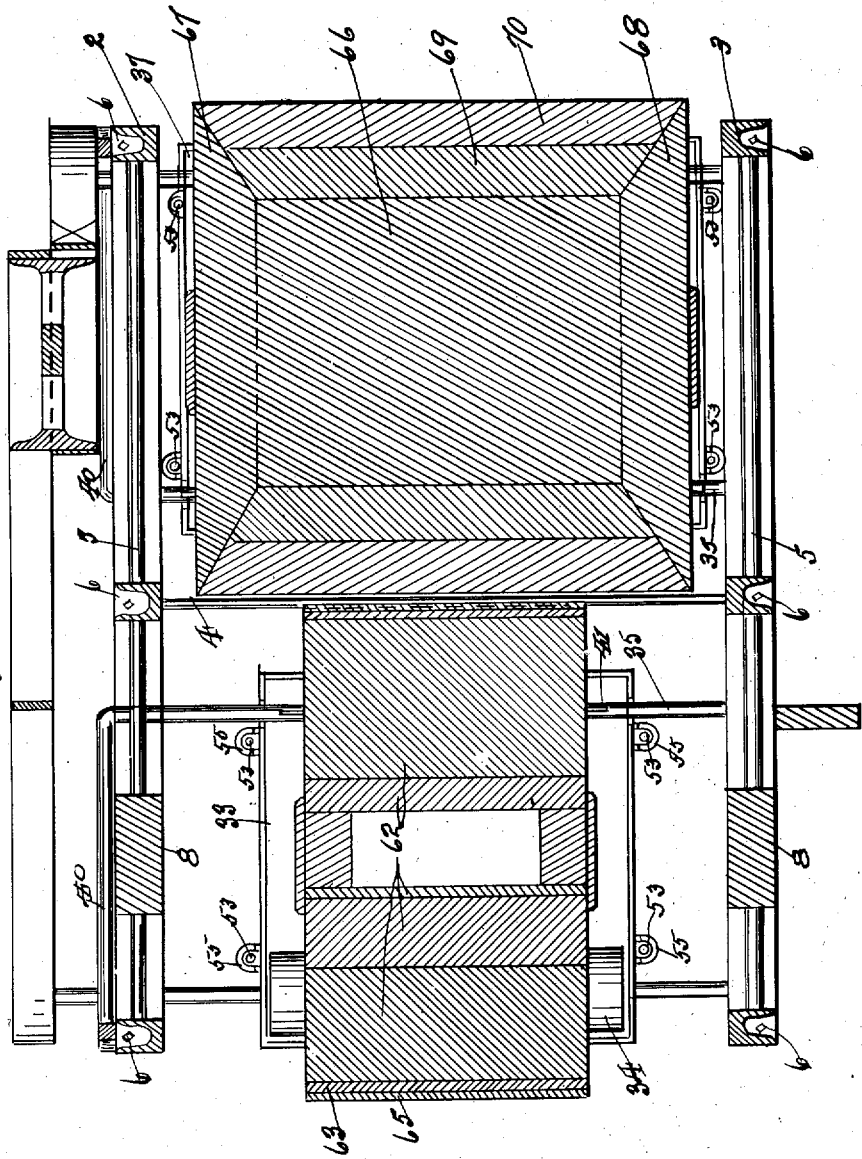

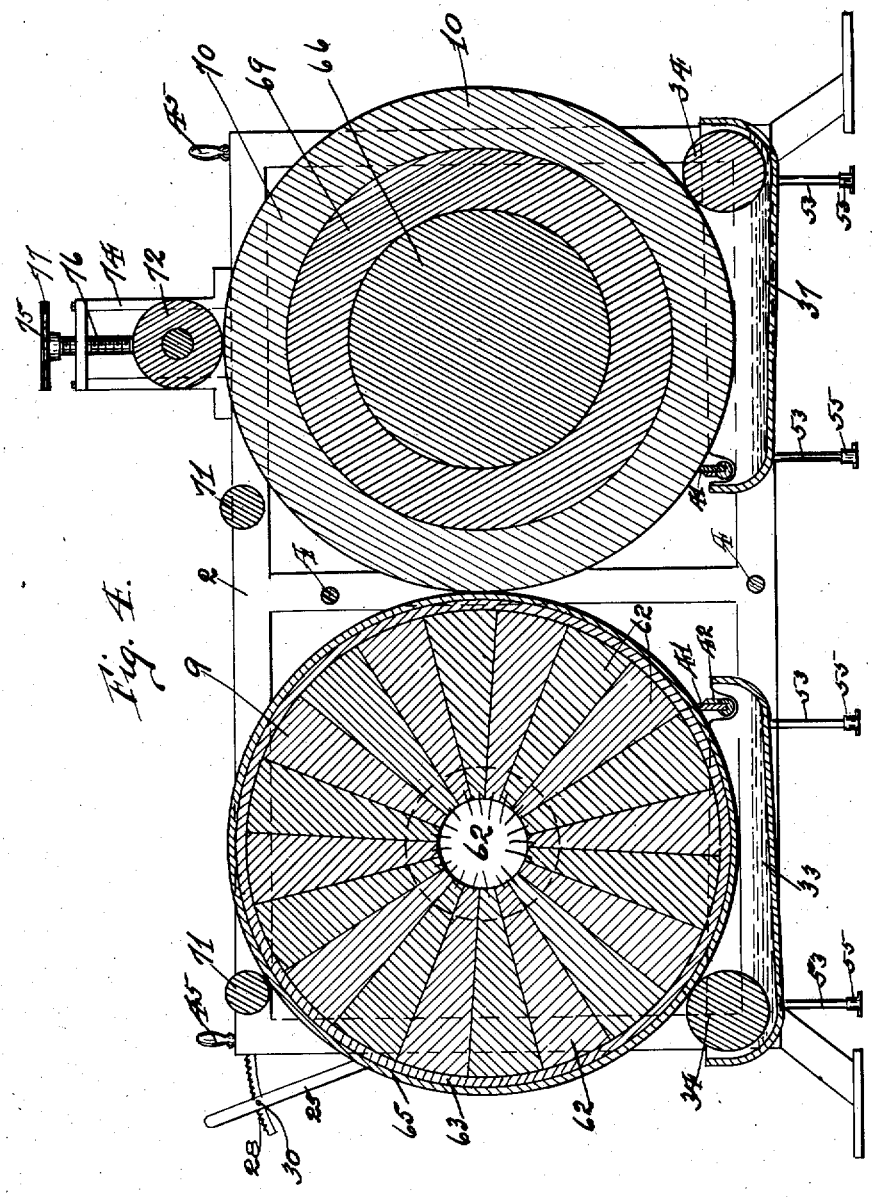

No. 853,644. PATENTED MAY 14, 1907.
B. D. MARKS.
GRAINING MACHINE.
APPLICATION FILED JAN. 30, 1905.
8 SHEETS—SHEET 5.
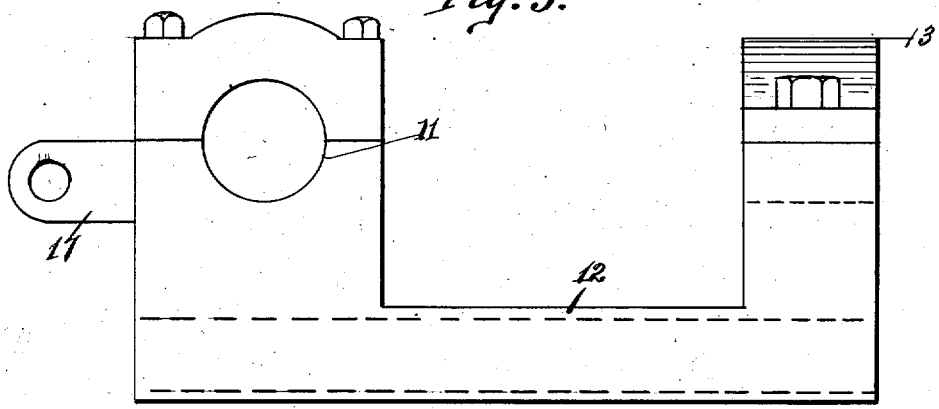
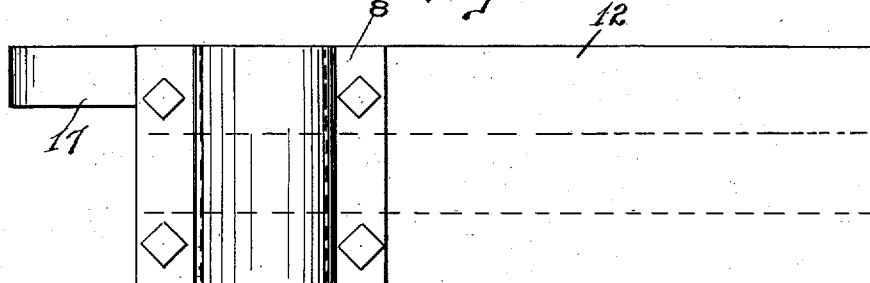
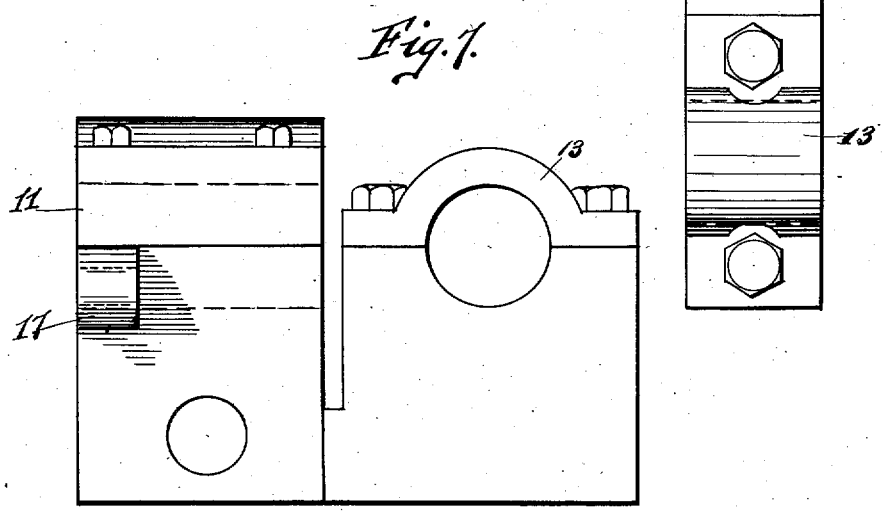
WITNESSES:
J. H. Carroll.
S. R. Lewis.
INVENTOR.
Bennett D. Marks
BY Harry Lea Dodson
ATTORNEY.

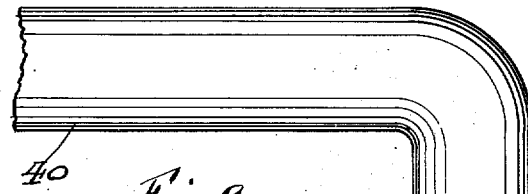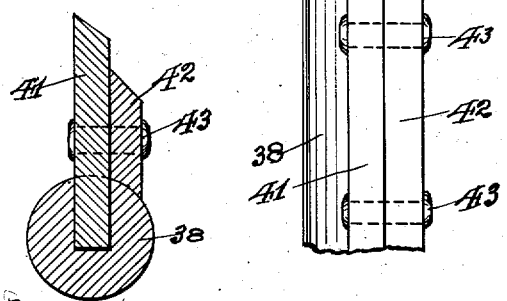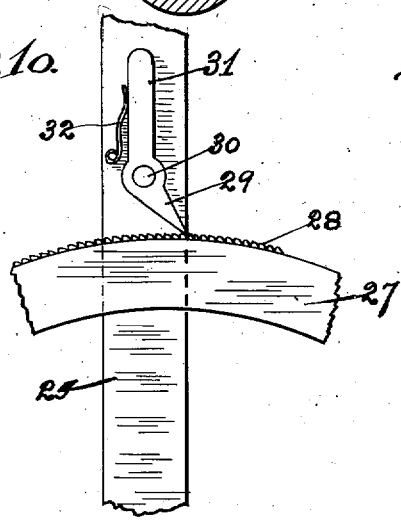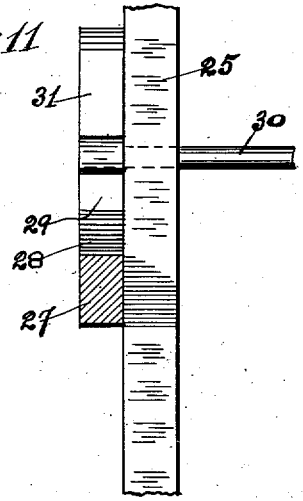

No. 853,644. PATENTED MAY 14, 1907.
B. D. MARKS.
GRAINING MACHINE.
APPLICATION FILED JAN. 30, 1905.
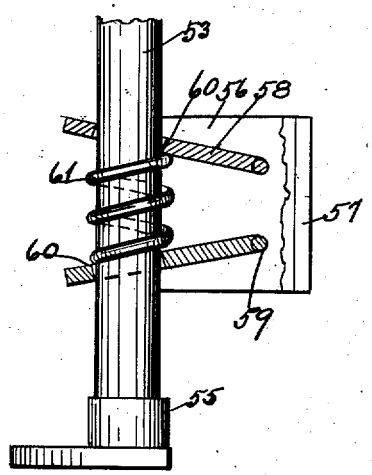
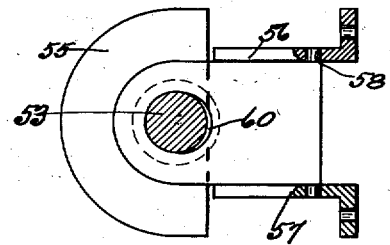
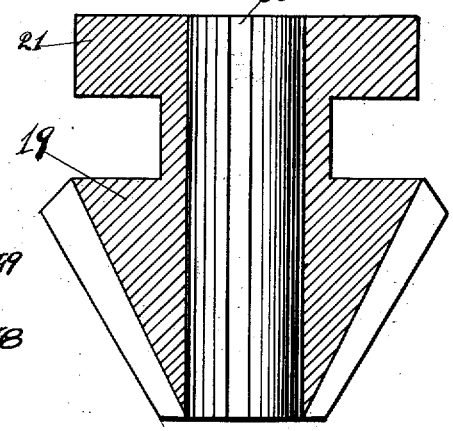
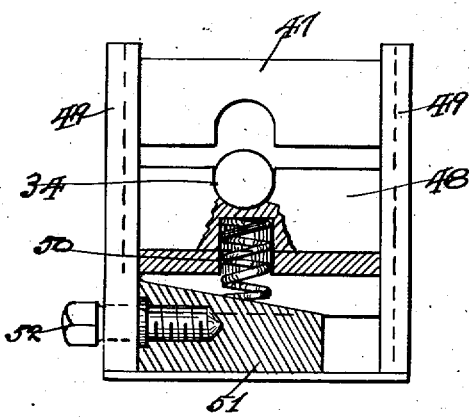

UNITED STATES PATENT OFFICE.

BENNETT D. MARKS, OF CHICAGO, ILLINOIS, ASSIGNOR TO MARKS AUTOMATIC WOOD REPRODUCING COMPANY, OF CHICAGO, ILLINOIS.

GRAINING-MACHINE.

No. 853,644.　　　Specification of Letters Patent.　　　Patented May 14, 1907.

Application filed January 30, 1905. Serial No. 243,203.

*To all whom it may concern:*

Be it known that I, BENNETT D. MARKS, a citizen of the United States, residing at Chicago, in the county of Cook and State of Illinois, have invented certain new and useful Improvements in Graining-Machines, of which the following is a specification.

My invention relates to that class of machines whereby the grain of the wood is transferred to a printing cylinder and from that to the wood. The use of machines of this kind has developed the fact that it is essential for their successful operation that means should be provided for a simultaneous adjustment of all the parts which engage the rollers. The machines with which I am familiar fail to provide this very necessary feature, and my invention has for its object to avoid this objection and to simplify the construction, make its action more positive, provide a positive and accurate adjustment for the rollers, and other new and useful features more particularly pointed out hereinafter in the specification and claims.

My method of accomplishing the foregoing may be more readily understood by having reference to the accompanying drawings, which are a part of this specification and are hereunto annexed, in which Figure 1 is a side elevation of my improved machine. Fig. 2 is a top or plan view of the same. Fig. 3 is a section taken on the lines X X in Fig. 1. Fig. 4 is a section taken on the lines *h h* in Fig. 2. Figs. 5, 6 and 7 are detail views of the roller, adjustment and bearing box. Figs. 8 and 9 are enlarged details of a part of the scraper. Figs. 10 and 11 are enlarged details of the roller adjustment. Figs. 12 and 13 are enlarged details of the adjustment for the pan legs. Fig. 14 is a sectional view of the bevel gear. Fig. 15 is a detail of the small roller bearing. Fig. 16 is an enlarged detail view partly in elevation and partly in section.

Similar figures refer to similar parts throughout the entire description.

The machine is constructed as shown in the drawings of a frame 1 which is designed in two side frames 2 and 3 which are secured together by means of stay-rods 4. Two shafts 5 extend along each side frame and are suitably journaled in boxes 6. These shafts, which are mounted upon the uprights of the side frames, furnish mountings for boxes 7 and 8 which furnish bearings for the shafts of the rollers 9 and 10. In machines of this description it is necessary to regulate the pressure with which these rollers engage each other with the utmost nicety and evenness. My method of accomplishing this is better shown in the detail views of the box 8, which is constructed with a journal bearing 11 and has an outwardly extending arm 12, from which a box 13 extends at right angles to the said arm. The roller 10 is rotated by means of a shaft 14, which may be driven by any suitable power, and has upon one side a bevel gear 15 which is in mesh with a corresponding gear 16 mounted upon the shaft 14 and secured thereto by means of a pin 20 or some other form of fastening, and which is journaled in the boxes 13 and 18. A gear 19, better shown in Fig. 14, corresponding in size to the gear 16 is splined upon this shaft and slidable thereon. This gear is constructed with a hub which extends through the box 13 and terminates in a collar 21, so that the movement of the box will move the gear. A feather 36 is provided in said gear and slides in the slot 37 in the shaft 14. This gear is in mesh with a bevel gear 22 mounted upon and secured to the roller 9. It is obvious that since the boxes 8 and 13 are formed in one piece that the movement of the roller 9 will move the gear 19 with it and as a consequence keep it in constant engagement with the gear 22. A lug 17 extends from the end of the box and has pivotally attached thereto a link 23, whose opposite end is secured by means of a pin or pivot 24 to the end of the lever 25, which is fulcrumed upon an outwardly extending lug 26 which extends from the end of the side frame. A segment 27 is attached to the upper part of the frame and has a number of teeth 28 cut upon its upper face. As better seen in the detail views, these teeth are engaged by a pawl 29, which is mounted upon a rod 30 and has an upwardly extending arm 31 which is engaged by a flat spring 32 or some other convenient spring-actuated means. A similar construction is followed on the opposite side of the frame, the rod 30 extending across the machine and through the levers 25. The result of this construction would be that when it is desired to adjust the friction existing between the two rollers, by moving the rod 30 outwardly the pawl will slide over the ratchet teeth 28 and through the medium of the lever, link and adjustment bearing boxes will move the roller 9, and will move both sides of it at the same time with the utmost accuracy and niceness, and while the extended arm on the box 8 will keep the gear 19 in constant engagement with the bevel gear 22 so that roller can be moved back and forward at will without taking it out of adjustment. This is especially desirable because after the machine has operated all day it is necessary to clean the rollers off which is done by putting benzin or some other paint remover into pans 33 and 37, which are mounted beneath each of the rollers. The rollers are rotated and the cleansing liquid is transferred to their surface through the medium of a small roller 34 located in the end of the pan 33 and is scraped off of the surface of the rollers by means of scrapers 35. A similar operation is followed regarding the other roller, which, however, it may be found desirable to construct as a brush rather than a roller in practice. These scrapers are constructed as better shown in the detail views of a rod 38 which extends across from the side frames 2 and 3 and is suitably journaled in boxes 39 mounted upon the lower crossbars of said frames. The end 40 of this rod is bent at right angles thereto and extends along the side of the frame as indicated by the dotted lines in Fig. 1. A scraper 41 formed of leather or some other suitable material is mounted in a slot milled into the rod 38 and is re-inforced or stiffened by a strip of metal 42 which is attached thereto by means of rivets 43 or any other suitable method of fastening. The end of the upwardly extending arm 40 is engaged by the lower end 44 of a lever 45. This end 44 is formed eccentrically so that the movement of the handle on the opposite end of the lever 45 will cause the foot 44 to press down upon the arm 40, thereby raising the scraper and causing it to bear firmly against the face of the rollers. This pressure may be regulated by moving the lever to any position wished, it being held in place by means of a segment and clutch of ordinary construction. A similar method is carried out as regards the scraper for the other roller.

The two levers 45 may be connected as indicated by the dotted lines, by lever connections 46, or may be arranged separately as shown.

It is desirable that the small roller 34 should exert a constant and even pressure against the surface of the roller in order to transfer the paint or printing mixture evenly. This is accomplished as better shown in Fig. 15, which is an enlarged detail view of the box which forms a bearing for the ends of the roller. This box is formed of two halves 47 and 48, which are slidable in a groove in the two upright portions 49, the end of the roller 34 resting in a journal bearing formed in the center of the lower half of the box 48. A coil spring 50 is mounted in an opening formed directly beneath the end of the shaft 34 and the lower end of this spring bears on the face of an inclined wedge 51, the result being that there is a constant pressure against the shaft of the roller and as a result against the face of the large roller. This tension may be regulated by means of a screw 52 which is threaded into the inclined wedge 51 so that by turning it the wedge is advanced and the tension of the spring is correspondingly increased, thus insuring a constant and even friction between the face of the two rollers.

The pans 33 and 37 are mounted upon legs 53 which are adjustable, so that it is possible to easily and quickly raise or lower the pans either for the purpose of removing them or to keep the liquid in the end where the roller or brush is located. The method of adjustment is more clearly shown in the detail views, Figs. 12 and 13, Fig. 12 being an elevation partly in section. Fig. 13 is a top or plan view with a part of the side walls broken away to show the bearing of the clamp. The leg 53 is provided with a foot 55 to insure steadiness. Attached to the side of the pans is a box or trap having two side walls 56 and 57. These walls are riveted or bolted to the sides of the pan and have journaled in themselves two plates 58 and 59. These plates are formed with openings 60 which are of slightly larger diameter than the leg 53. A coil spring 61 is located around the leg 53 and intermediate to the plates 58 and 59; the result being that the spring, tending to expand, spreads the two plates and causes the edges of the openings 60 to engage the leg 53 and clamp it securely. When it is desired to raise or lower the leg, by squeezing the plates together and compressing the spring it becomes possible to move the leg up and down at the will of the operator and being released it will automatically clamp and hold itself in the position desired.

In a machine of this character, it has been found extremely difficult to construct a roller from which the grain is to be transferred which would not get out of true and as a consequence warp or crack. I overcome this difficulty by the improved construction of my roller, which is more clearly seen in Fig. 4 and for which I have filed an application for Letters Patent of the United States. This roller is formed of a series of boards 62 which are tapered and fitted in radially around the hub, in which is fastened the shaft of the roller 8. This construction opposes a perfect resistance to the go of the different pieces of wood, and owing to the taper the requisite strength of the wood is relatively increased as the distance is increased from the center of the roller, so that as it reaches or nears the periphery thereof it is strongest. The surface of these boards is then turned true and a covering 63, which is preferably formed of hard rubber, although some other material may be found as desirable in practice, is formed or molded around the edge of the roller. This surface being turned leaves a perfect surface to which to secure the wood from which the grain is to be transferred 65, the result being that when this construction is followed a practically true roller is made which will maintain its even surface under any and all conditions.

In machines of this character it is very desirable to have the roller to which the grain of the wood is transferred of such construction as to permit it to be used not only in straight work but for graining irregular shapes, such as door panels, molding, etc. My method of constructing my composition roller enables the operator to print any sort of material desired without difficulty. This construction which has been made the subject matter of an application for Letters Patent of the United States is more clearly illustrated in Figs. 3 and 4, in which 66 is a spool or core which is formed in the usual manner with flanges 67 and 68. A layer of spongy substance, both elastic and compressible, preferably sponge rubber, 69 is formed or molded around the core 66. The thickness of this substance should be regulated to adapt itself to the size of the molding or irregular surfaces which it is desired to grain. A composition 70 formed of glue and molasses, or some equivalent composition, is then molded around the sponge rubber 69. The result of this construction is obvious. When a molding is fed into the machine the composition will conform to the lines offered by the face of the molding, it being permitted to yield by the spongy substance and as soon as the molding is passed through, the spongy material, due to its resilience, will cause the roller to resume its natural and regular surface.

Rollers 71, the ends of which are journaled in the side frames 2 and 3, are adapted to carry the material which is to be printed to the face of the roller 10. A roller 72 is provided to hold the material in engagement with the face of the roller 10, said roller being journaled in bearings 73 which are slidable in guides 74 mounted upon the side frames 2 and 3. I mount a sprocket wheel 75 upon the upper end of a screw 76 which is attached to the journal bearing 73. A chain 77 extends across the machine to the sprocket mounted on the opposite side. The sprocket mounted upon the side frame 3 is provided with a handle 78.

The operation of my machine is as follows: A quantity of paint is placed in the pan 33 and a quantity of benzin or other paint-remover is placed in the pan 37. The wheels are then rotated and through the medium of the roller 34 the paint is transferred to the face of the roller 9, the surplus being scraped off by the scraper 41, leaving the pores of the grain filled with paint. This is transferred to the surface of the roller 10. The material desired to be printed is then placed upon the rollers 71. These rollers may be provided with guides so as to insure the straight travel of the material to be printed. The material is held in engagement with the face of the roller 10 through the medium of the roller 72. In machines with which I am familiar, it has been practically impossible to adjust this roller so as to cause it to exert an absolutely even pressure and as a consequence the grain of the wood is transferred either only to one side or the other, or in some instances will press so hard as to blur the grain and thereby spoil the impression. This objection is utterly avoided by my construction, since the sprocket wheels, being provided with the chain 77, necessarily move in perfect unison. The result is obvious that the rotation of the two wheels is simultaneous and as a consequence the roller 72 is raised or lowered perfectly even and as a consequence exerts an even pressure upon the material, the result being that it becomes possible to secure a perfect impression through operation. Having transferred the impression, the face of the roller 10 is washed by the benzin in the pan 37 and scraped off by the roller, thus presenting a new clean surface to receive the impression from the graining roller.

Having described my invention, what I regard as new and desire to secure by Letters Patent is 1. In a graining machine, the combination of two side frames, rods extending along said frames, journal bearings mounted on said rods, a veneer and a printing roller mounted upon shafts journaled in said journal bearings, bevel gears fixedly attached to one end of said shafts, a bevel gear mounted upon a shaft and meshing with the bevel gear on the printing roller, a bevel gear splined upon said shaft and meshing with the bevel gear on the veneer roller, said gear being constructed with a hub, said hub terminating in a collar, an arm extending at right angles from said arm, said box furnishing a bearing for the hub of said gear, a lug extending from each of the journal-bearings of the veneer roller, links attached to said lugs, whose opposite ends are attached by pins or pivots to levers, a rod connecting said levers, a spring-actuated pawl mounted upon said rod, said pawl being adapted to engage the ratchet teeth cut on segments mounted upon the side frames of the machine, for the purpose set forth substantially as described.

2. In a graining machine, the combination of a graining and printing roller, with pans arranged underneath said rollers, legs for supporting the pans, said pans being adjustable longitudinally of the supporting legs.

3. In a graining machine, the combination of a graining and printing roller, with pans arranged underneath said rollers, the legs for supporting the pans, and spring pressed plates carried by the pans engaging the legs to adjust the pans on the legs.

4. In a graining machine the combination of a graining and printing roller, with pans arranged underneath said roller, legs for supporting the pans, said pans being adjustable on the legs and expanding means carried by the pans for engaging the legs to hold the pans in their various adjustments on the legs.

5. In combination, side frames, rods carried by said frames, bearings immovably carried by the rods, a roller mounted in the immovable bearings, bearings slidable on the rods, a roller mounted in the sliding bearings, gear wheels on both of the rollers, a shaft, a gear wheel immovably mounted on the shaft meshing with the gear on the immovable roller, a gear wheel slidable on the shaft and meshing with the gearing on the slidable roller, means for moving the slidable roller on the rods, and means whereby the sliding gear is caused to move in unison with the sliding roller.

6. In combination, side frames, rods carried by said frames, bearings immovably carried by the rods, a roller mounted in the immovable bearings, bearings slidable on the rods, a roller mounted in the sliding bearings, an arm on one of the sliding bearings, a box carried by the arm, gear wheels on both the rollers, a shaft extending through the box of the arm, a gear wheel immovably mounted on the shaft meshing with the gearing on the immovable roller, a gear wheel slidable on the shaft and meshing with the gear of the movable roller, said gear being held by the box, and means for moving the slidable roller on the rods.

7. In combination, side frames, rods carried by said frames, bearings immovably carried by the rods, a roller mounted in the immovable bearings, bearings slidable on the rods, a roller mounted in the sliding bearings, an arm on one of the sliding bearings, a box carried by the arm, gear wheels on both rollers, a shaft extending through the box of the arm, a gear wheel immovably mounted on the shaft meshing with the gearing on the immovable roller, a gear wheel slidable on the shaft and meshing with the gear of the movable roller, a hub on the gear wheel extending through the box, a collar on the hub to hold said gear wheel against displacement, and means for moving the slidable roller on the rods.

8. In combination, side frames, rods carried by the said arms, bearings immovably carried by the rods, a roller mounted in the immovable bearings, bearings slidable on the rods, lugs on the slidable bearings, a roller mounted in the sliding bearings, gear wheel on both of the rollers, a shaft, a gear wheel mounted on the shaft meshing with the gear on the immovable roller, a gear wheel slidable on the shaft and meshing with the gearing on the slidable roller, means whereby the sliding gear is caused to move in unison with the sliding roller, links pivoted to the lugs of the sliding bearings, lugs on the side frames, and levers pivoted to the lugs, said levers having the links pivotally secured thereto.

9. In a graining machine, the combination of a graining and printing roller, scrapers therefor movable with relation thereto and means for causing the scrapers of the graining and printing rollers to move simultaneously.

10. In a graining machine, the combination of a graining and printing roller, scrapers for said rollers movable with relation thereto, levers for imparting the desired movement to the scrapers, and a connection between the levers whereby said scrapers are moved simultaneously.

11. In a graining machine, the combination of graining and printing rollers, scrapers for the rollers, each scraper comprising a rod extending across the frame and mounted therein, an angular extension on the rod terminating in a crank, a lever carried by the frame engaging the crank of the extension, and a scraper proper secured to the rod, and connections between the levers of the scrapers for moving said scrapers simultaneously.

12. In a graining machine, the combination of graining and printing rollers with pans arranged therebeneath, legs for supporting the pans, said pans being adjustable longitudinally of the supporting legs, small rollers yieldably held within the pans contacting with the rollers, and means for regulating the tension of the yieldable rollers.

13. In a graining machine, the combination of a graining and printing roller with pans arranged underneath said rollers, legs for supporting the pans, said pans being adjustable longitudinally of the supporting legs and small rollers within the pans contacting with the rollers.

14. In a graining machine, the combination of graining and printing rollers with pans arranged underneath said rollers, legs for supporting the pans, said pans being adjustable longitudinally of the supporting legs and small rollers yieldably held within the pans contacting with the rollers.

BENNETT D. MARKS.

Witnesses:
RAY C. GRISWOLD,
J. H. CARROLL.